Patented Mar. 13, 1951

2,545,093

UNITED STATES PATENT OFFICE 2,545,093

ACYLAMINO-ACYLOXY-PRO-PIONAPHTHONES

Loren M. Long, Grosse Pointe Woods, and Harvey D. Troutman, Ferndale, Mich., assignors to Parke, Davis & Company, Detroit, Mich., a corporation of Michigan No Drawing. Application January 21, 1950, Serial No. 139,956

8 Claims. (Cl. 260—477)

This application is a continuation in part of our co-pending application, Serial Number 83,770, filed March 26, 1949, now U. S. Patent 2,516,130, and the invention relates to new keto amido alcohols and to chemical methods useful for their synthesis. More particularly, the invention relates to naphthyl α-acylamido-β-acyloxyethyl ketone compounds having the formula,

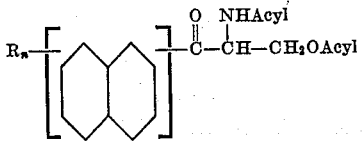

where $n$ is 1 or 2 and R is the same or different and represents hydrogen, halogen, nitro, lower alkyl or lower alkoxy radicals. The term "acyl" as used herein includes carboxylic acid acyl radicals, such as saturated and unsaturated lower aliphatic acyl, halogen substituted lower aliphatic acyl, carboxy substituted lower aliphatic acyl, cyano substituted lower aliphatic acyl, ether substituted lower aliphatic acyl, ester substituted lower aliphatic acyl, hydroxy substituted lower aliphatic acyl, benzoyl, substituted benzoyl, araliphatic acyl, furoyl, pyridinoyl and the like radicals.

In accordance with the invention, naphthyl α-acylamido - β-acyloxyethyl ketone compounds having the above formula are obtained by treating a naphthyl α-acylamido-β-hydroxyethyl ketone of formula,

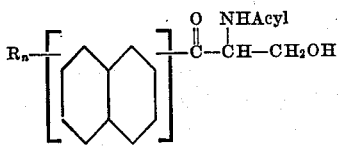

with an acylating agent under substantially anhydrous conditions either alone or in the presence of an acylation cataylst, where R and $n$ have the same significance as given above. The transformation involved can be diagrammatically illustrated as follows:

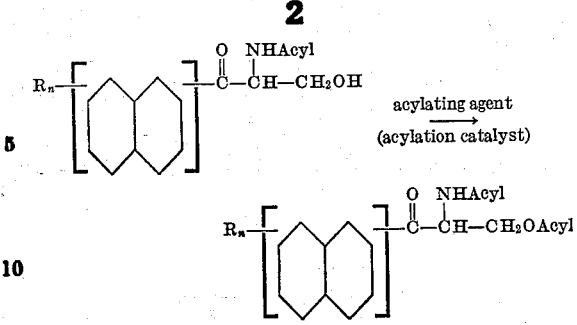

where R and $n$ have the same significance as given above.

The conversion of the naphthyl α-acylamido-β-hydroxyethyl ketone compounds to the corresponding β-acyloxy derivatives of the present invention can be effected by treating the β-hydroxy ketone compound with an acyl halide or acyl anhydride under substantially anhydrous conditions either alone or in the presence of an acylation catalyst such as an inorganic base, an alkaline salt of an organic acid, an organic tertiary base, an aromatic sulfonic acid or sulfuric acid. The acylation can, in general, be carried out at a temperature varying from about 10° to 140° C. but the preferred temperature for the reaction is between about 60° and 120° C. An inert organic solvent such as benzene, petroleum ether, toluene and the like can be used for the reaction if desired, although in most cases it is more expedient to omit the use of a solvent and to merely use an excess of the acylating agent. Some of the catalysts which can be used to bring about the reaction in a shorter period of time are sodium hydroxide, potassium hydroxide, potassium carbonate, sodium acetate, pyridine, quinoline, triethylamine, N-ethylmorpholine, N-methylpiperidine, N,N - dimethylaniline, p - toluenesulfonic acid and sulfuric acid.

The products of the invention are useful as intermediates in the preparation of other organic compounds. They are of particular value in preparation of organic compounds possessing unique antibiotic acitivity.

The invention is illustrated by the following examples:

Example 1

20 g. of 6-methyl-2-napthyl α-(p-toluyl-amido)-β-hydroxyethyl ketone is heated at about 75° C. for one-half hour with 40 cc. of acetic anhydride containing a very small amount of concentrated sulfuric acid. The reaction mixture is evaporated to dryness in vacuo, the residue washed with ice water and purified by recrystallization from methanol or ethanol. The product thus obtained is 6-methyl-2-naphthyl α-(p-toluylamido)-β-acetoxyethyl ketone of the formula,

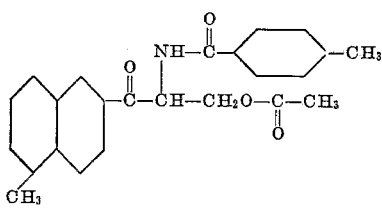

Example 2

8 g. of 4-nitro-1-naphthyl α-acetamido-β-hydroxyethyl ketone is heated at about 60° C. for one-half hour with 20 cc. of acetic anhydride and 10 cc. of pyridine. The reaction mixture is evaporated to dryness in vacuo, the residue washed with ice water and purified by recrystallization from alcohol. The product thus obtained is 4-nitro-1-naphthyl α-acetamido β-acetoxyethyl ketone of formula,

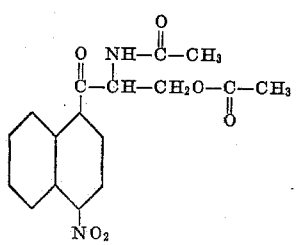

Example 3

20 g. of 1-naphthyl α-benzamido-β-hydroxyethyl ketone is heated at about 70° C. for one hour with 50 cc. of benzoyl chloride and 25 cc. of pyridine. The reaction mixture is evaporated to dryness in vacuo, the residue washed with ice water and purified by recrystallization from alcohol. The product thus obtained is 1-naphthyl α-benzamido-β-benzoxyethyl ketone of formula,

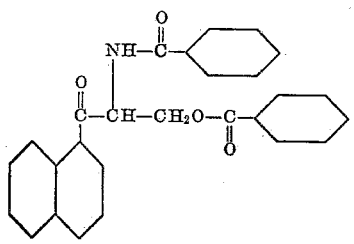

Example 4

5 g. of 2-naphthyl α-cyanoacetamido-β-hydroxyethyl ketone is heated at about 65° C. for one hour with 10 g. of furoic anhydride containing a very small amount of concentrated sulfuric acid. The reaction mixture is evaporated to dryness in vacuo, the residue washed with ice water and purified by recrystallization from methanol. The product thus obtained is 2-naphthyl α-cyanoacetamido-β-furoyloxyethyl ketone of formula,

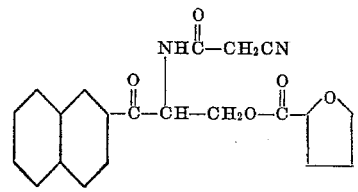

Example 5

5 g. of 4-ethoxy-1-naphthyl α-bromoacetamido-β-hydroxyethyl ketone is added to a solution of 10 g. of nicotinoyl chloride in 50 cc. of benzene. The mixture is refluxed for two hours. The cold reaction mixture is poured into 1 liter of ice water and the organic layer separated. The organic extract is washed with dilute acid, water, dilute sodium bicarbonate, and finally water, and then dried in vacuo. The dried organic extract is concentrated in vacuo and the residue is recrystallized from alcohol. The product thus obtained is 4-ethoxy-1-naphthyl α-bromoacetamido-β-nicotinoyloxyethyl ketone of formula,

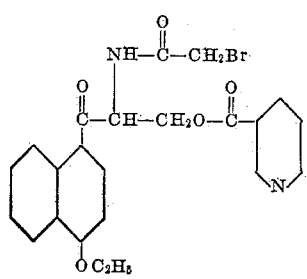

Example 6

10 g. of 8-ethyl-1-naphthyl α-methoxypropionamido-β-hydroxyethyl ketone is heated at about 75° C. for one-half hour with 10 g. of succinic anhydride containing a very small amount of concentrated sulfuric acid. The reaction mixture is evaporated to dryness in vacuo, the residue washed well with water and purified by recrystallization from methanol. The product thus obtained is 8-ethyl-1-naphthyl α-methoxypropionamido-β-succinoyloxyethyl ketone of formula,

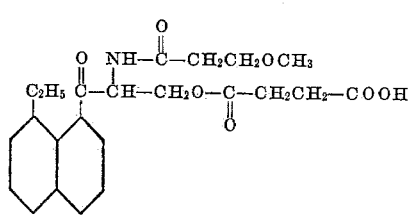

Example 7

A mixture consisting of 45 g. of 4-nitro-1-naphthyl α-dichloroacetamido-β-hydroxyethyl ketone, 150 g. of p-toluic anhydride and 18 g. of dry sodium acetate is heated at about 45° C. while small amounts of ice and water are added from time to time. After about one hour the mixture is diluted with 1 liter of water, cooled and adjusted to pH 8 with sodium hydroxide. The 4-nitro-1-naphthyl α-dichloroacetamido-β-p-toluyloxyethyl ketone which separates from the solution is collected, washed with water and dried. This product has the formula,

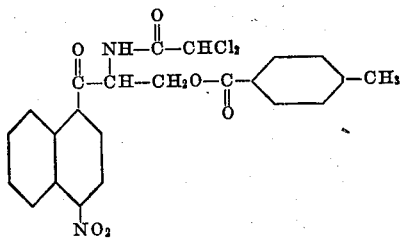

Example 8

20 g. of 4-bromo-1-naphthyl α-acetoxyyacetamido-β-hydroxyethyl ketone is heated at about 70° C. for one-half hour with 40 g. of chloroacetic anhydride containing a very small amount of concentrated sulfuric acid. The reaction mixture is evaporated to dryness in vacuo, the residue washed with ice water and purified by recrystallization from ethanol. The product thus obtained is 4-bromo-1-naphthyl α-acetoxyacetamido-β-chloroacetoxyethyl ketone of formula,

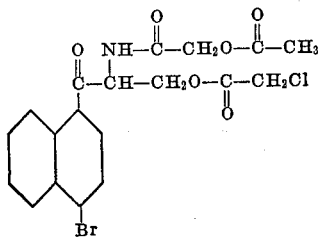

Example 9

10 g. of 2-naphthyl α-nicotinamido-β-hydroxyethyl ketone is heated at about 70° C. for one-half hour with 20 g. of fluorocetic anhydride containing a very small amount of concentrated sulfuric acid. The reaction mixture is evaporated to dryness in vacuo, the residue washed with ice water and purified by recrystallization from methanol. The product thus obtained is 2-naphthyl α-nicotinamido - β - fluoroacetoxyethyl ketone of formula,

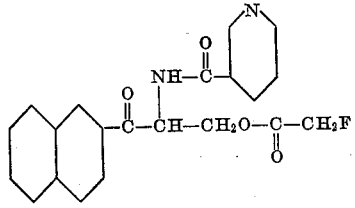

Example 10

20 g. of 5-chloro-1-naphthyl α-benzamido-β-hydroxyethyl ketone is heated at about 75° C. for one-half hour with 40 g. of crotonyl chloride containing a very small amount of pyridine. The reaction mixture is evaporated to dryness in vacuo, the residue washed with ice water and purified by recrystallization from ethanol. The product thus obtained is 5-chloro-1-naphthyl α-benzamido-β-crotonyloxyethyl ketone of formula,

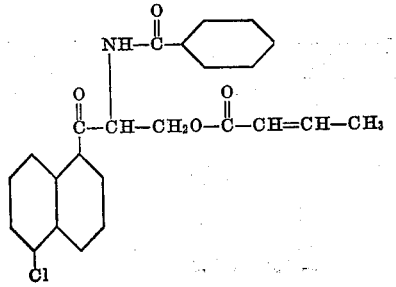

Example 11

A mixture of 10 g. of 6-iodo-1-naphthyl α-furamido-β-hydroxyethyl ketone, 10 ml. of benzoyl chloride, 5 ml. of pyridine in 100 ml. of dry benzene is refluxed for two hours. The mixture is cooled, concentrated in vacuo and the residue treated with 100 ml. of cold water. The oil which separates is extracted with ethyl ether and the organic extract is washed with dilute hydrochloric acid, water, dilute sodium bicarbonate solution and finally water. The dried ethereal layer is concentrated in vacuo and the residue is recrystallized from ethyl alcohol. The product thus obtained is 6-iodo-1-naphthyl α-furamido-β-benzoxyethyl ketone of formula,

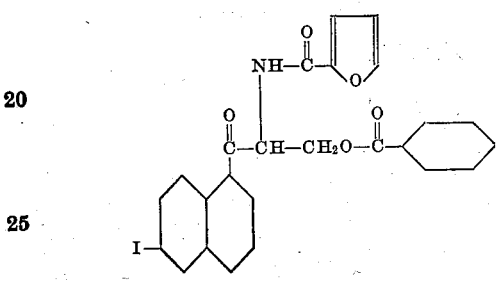

Example 12

5 g. of 1-naphthyl α-phenylacetamido-β-hydroxyethyl ketone, 5 g. of phenylacetyl chloride, 2.5 ml. of pyridine and 50 ml. of dry benzene are refluxed for two hours. The mixture is concentrated in vacuo and the residue is treated with 50 ml. of cold water. The oil which separates is extracted with ethyl ether and the organic extract is washed with dilute hydrochloric acid, water, dilute sodium bicarbonate solution and finally water. The dried ethereal layer is concentrated in vacuo and the residue is recrystallized from methanol. The product thus obtained is 1-naphthyl α-phenylacetamido-β-phenylacetoxyethyl ketone of formula,

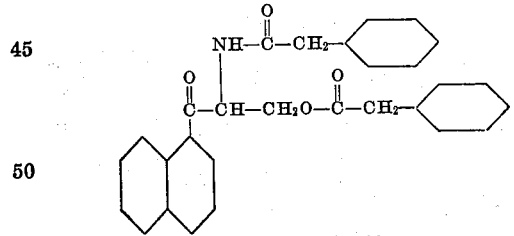

Example 13

20 g. of 4-methoxy-1-naphthyl α-acetamido-β-hydroxyethyl ketone is heated at about 70° C. for one-half hour with 40 g. of β-methoxypropionic anhydride containing a very small amount of concentrated sulfuric acid. The reaction mixture is evaporated to dryness in vacuo, the residue washed with ice water and purified by recrystallization from methanol. The product thus obtained is 4-methoxy-1-naphthyl α-acetamido-β,β'-methoxypropionyloxyethyl ketone of formula,

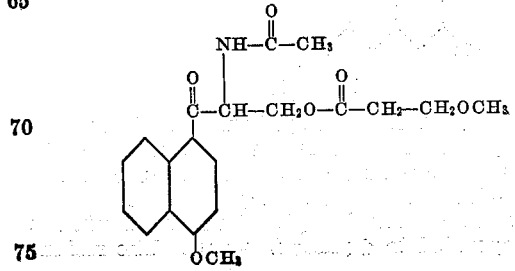

Example 14

10 g. of 1-naphthyl α-fluoroacetamido-β-hydroxyethyl ketone is heated at about 75° C. for three-quarters of an hour with 15 g. of cyanoacetyl bromide containing a very small amount of p-toluene sulfonic acid. The reaction mixture is evaporated to dryness in vacuo, the residue washed with ice water and purified by recrystallization from methanol. The product thus obtained is 1-naphthyl α-fluoroacetamido-β-cyanoacetoxyethyl ketone of formula,

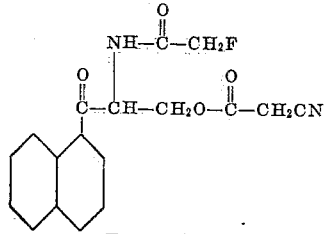

Example 15

5 g. of 4-nitro-1-naphthyl α-dichloroacetamido-β-hydroxyethyl ketone is heated at about 70° C. for one-half hour with 8 g. of dichloroacetic anhydride containing a very small amount of concentrated sulfuric acid. The reaction mixture is evaporated to dryness in vacuo, the residue washed with ice water and purified by recrystallization from methanol. The product thus obtained is 4-nitro-1-naphthyl α-dichloroacetamido-β-dichloroacetoxyethyl ketone of formula,

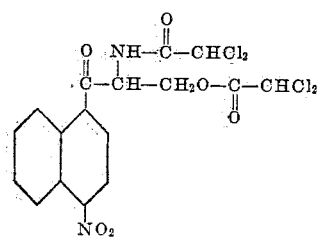

Example 16

A mixture of 5 g. of 3,6-dichloro-1-naphthyl α-benzamido-β-hydroxyethyl ketone in 10 g. of methyl lactate and 0.1 g. of p-toluenesulfonic acid is heated on the steam bath for three hours to effect complete removal of the methanol which is liberated in the reaction. The reaction mixture is evaporated to dryness in vacuo, the residue washed with ice water and purified by recrystallization from ethanol. The product thus obtained is 3,6-dichloro-1-naphthyl α-benzamido-β-α'-hydroxypropionyloxyethyl ketone of the formula,

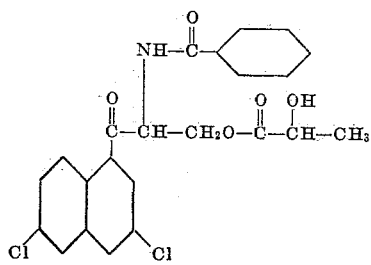

Example 17

10 g. of 4-nitro-1-naphthyl α-dichloroacetamido-β-hydroxyethyl ketone is heated at about 75° C. for one-half hour with 40 cc. of acetic anhydride containing a very small amount of concentrated sulfuric acid. The reaction mixture is evaporated to dryness in vacuo. The residue is washed with ice water and purified by recrystallization from ethanol. The product thus obtained is 4-nitro-1-naphthyl α-dichloroacetamido-β-acetoxyethyl ketone of the formula,

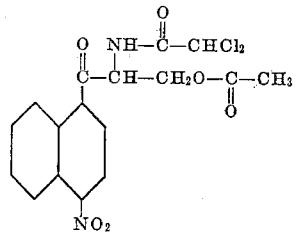

Example 18

A mixture of 10 g. of 1,8-dimethyl-2-naphthyl α-benzamido-β-hydroxyethyl ketone, 10 ml. of benzoyl chloride, 5 ml. of pyridine in 100 ml. of dry benzene is refluxed for two hours. The mixture is concentrated in vacuo and the residue is treated with 100 ml. of cold water. The oil which separates is extracted with ethyl ether and the organic extract is washed with dilute hydrochloric acid, water, dilute sodium bicarbonate solution and water. The dried ethereal layer is concentrated in vacuo and the residue is recrystallized from ethanol. The 1,8-dimethyl-2-naphthyl α-benzamido-β-benzoyloxyethyl ketone which was thus obtained has the structure,

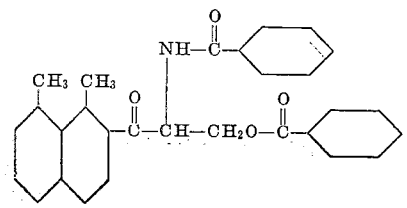

The naphthyl α-acylamido-β-hydroxyethyl ketone compounds used as starting materials in the practice of the invention can be prepared by the condensation of a naphthyl acylamidomethyl ketone with formaldehyde in the presence of an alkaline condensation catalyst according to the process described and claimed in our co-pending application, Serial Number 139,955, filed under even date herewith. For example, 1-naphthyl α-acetamido-β-hydroxyethyl ketone, starting material used in Example 1, can be prepared as follows:

60 g. of 1-naphthyl acetamidomethyl ketone is mixed with 300 cc. of methanol and 75 cc. of 40% formalin. 2 g. of sodium bicarbonate is added and the mixture is stirred at room temperature for about one hour. During this time the desired product separates. The insoluble 1-naphthyl α-acetamido-β-hydroxyethyl ketone of formula,

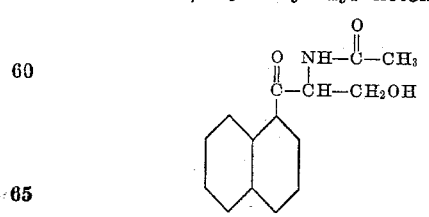

is collected and purified by recrystallization from ethyl acetate.

What we claim is:
1. A compound of formula,

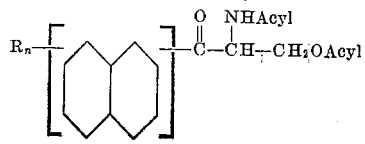

where $n$ is one of the integers 1 and 2 and R is a member of the class consisting of hydrogen, halogen, nitro, lower alkyl and lower alkoxy radicals.

2. A compound of formula,

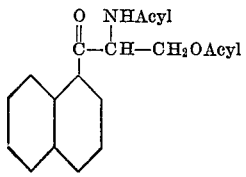

3. 1-naphthyl α-benzamido-β-benzoyloxyethyl ketone.

4. 1-naphthyl α-phenylacetamido-β-phenylacetoxyethyl ketone.

5. A compound of formula,

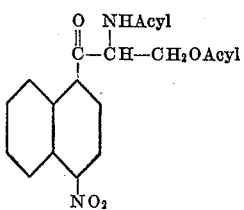

6. 4-nitro-1-naphthyl α-acetamido-β-acetoxyethyl ketone.

7. 4-nitro-1-naphthyl α-dichloroacetamido-β-acetoxyethyl ketone.

8. 4-nitro-1-naphthyl α-dichloroacetamido-β-dichloroacetoxyethyl ketone.

LOREN M. LONG.
HARVEY D. TROUTMAN.

No references cited.